Patented Jan. 28, 1941

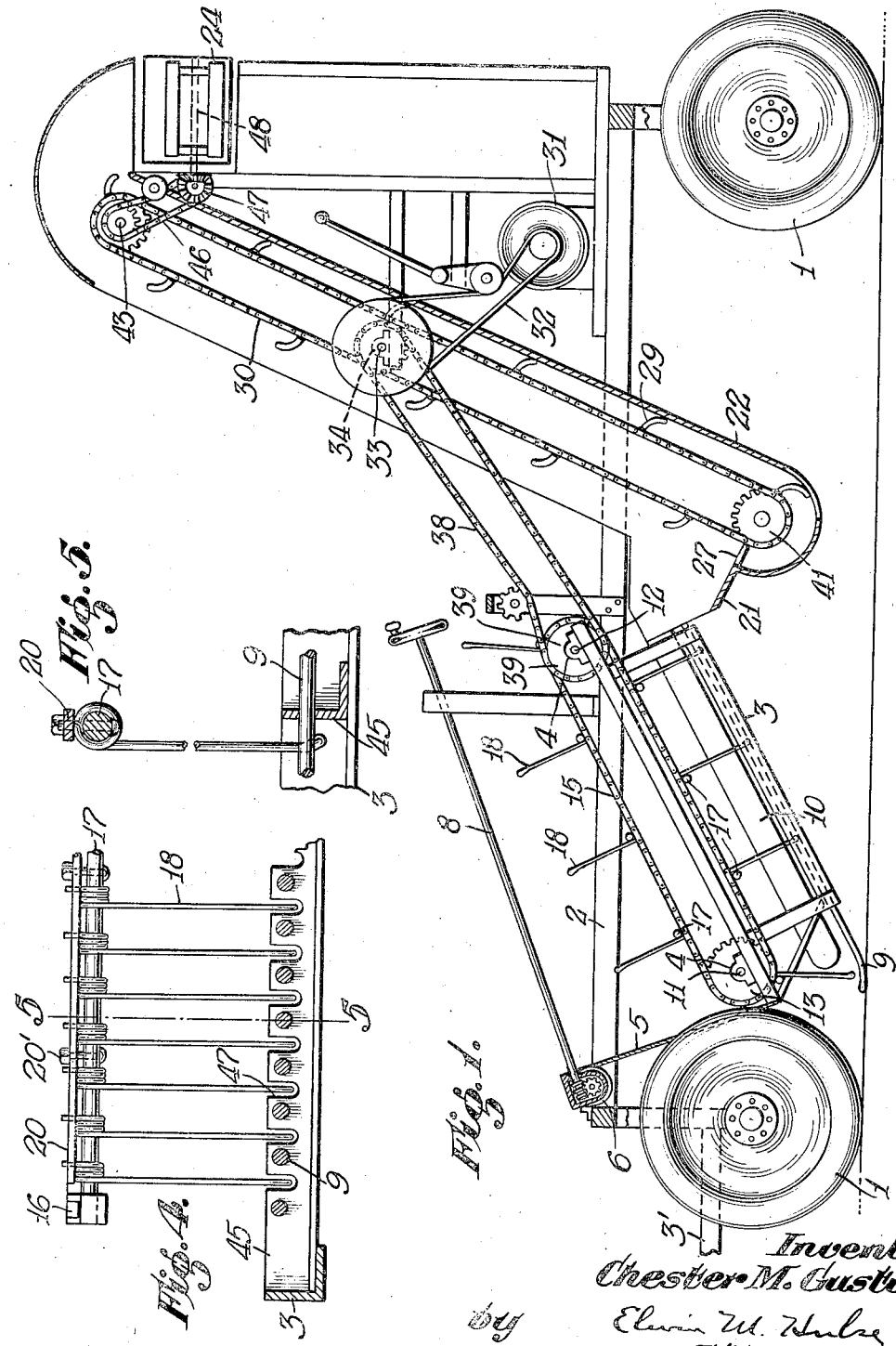

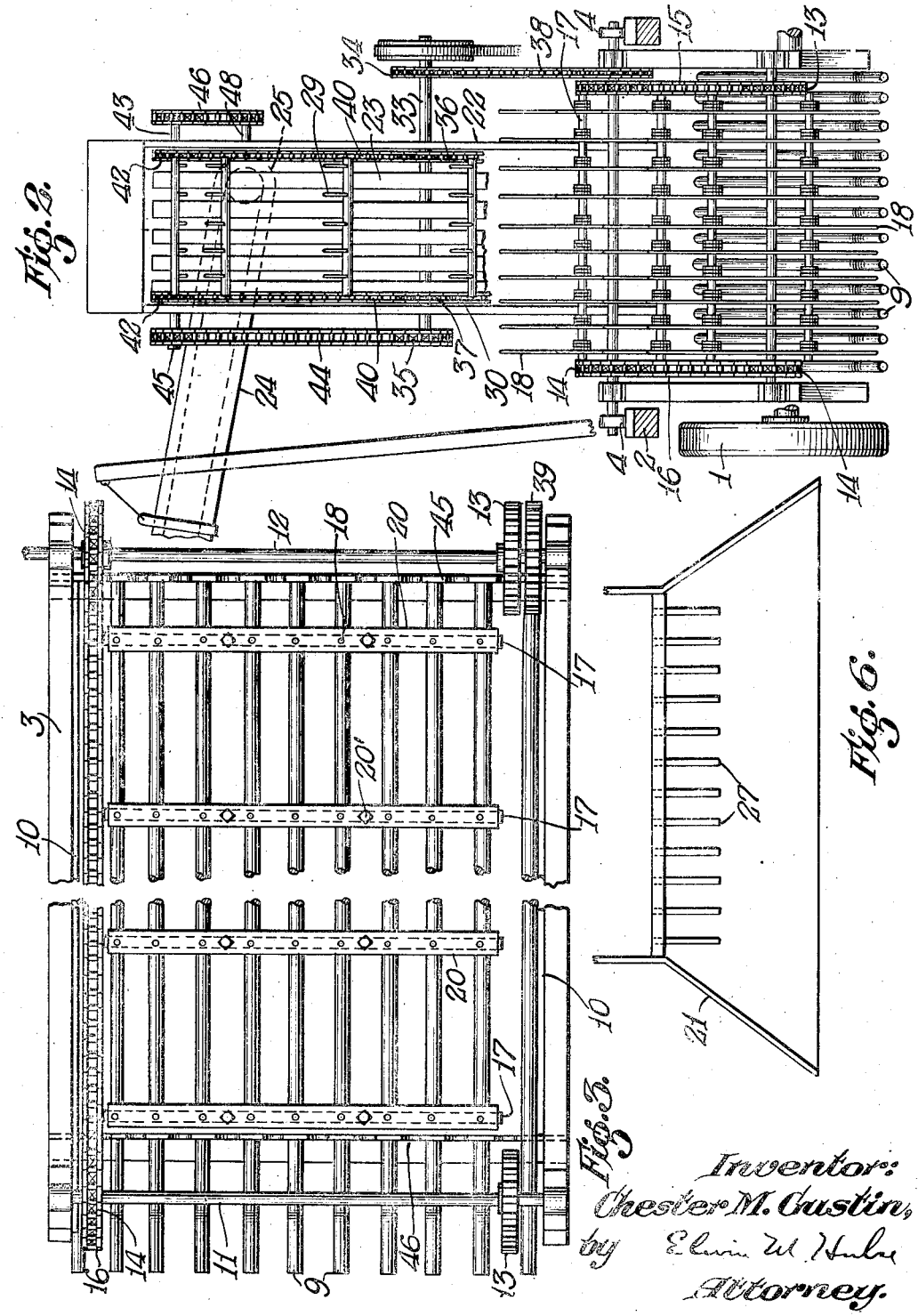

2,230,139

UNITED STATES PATENT OFFICE 2,230,139

LOADING MACHINE

Chester M. Gustin, Scipio Township, Allen County, Ind.

Application March 17, 1939, Serial No. 262,474

2 Claims. (Cl. 198—168)

The invention relates to loading machines and particularly to machines for loading beets from the field into a wagon or truck.

An item of considerable expense in the beet sugar industry is that of removing the beets from the field and delivering them to the market. Heretofore the beets, after being topped, are loaded by hand into a vehicle for transportation to the refinery or to a railway. Machines have been devised for removing the beets from the surface of the ground and conveying them into the vehicle for transportation, but so far as I am aware, no such machine has been efficient; the chief difficulty being that they do not efficiently pick up the beets from the ground nor get rid of the soil that is picked up with the beets.

The object of my invention is to provide a simple machine which will effectively pick up the articles from the surface of the ground and positively convey them to a point of discharge.

Another object is to provide a loading machine with novel and efficient mechanism by which articles, such as beets, are picked up from the ground and conveyed without injury.

Another object is to provide a loading machine wtih a novel and efficient mechanism for picking up topped beets from the ground and conveying the same, the said mechanism being adapted to remove and discharge the soil that is picked up with the beets.

The invention is illustrated in the accompanying drawings in which

Figure 1 is a side elevation partly in section of a machine embodying the invention.

Fig. 2 is a front elevation of the same partly in section.

Fig. 3 is a plan view of the pick-up conveyor mechanism.

Fig. 4 is an elevation of a fraction of the latter mechanism.

Fig. 5 is a cross-section on line 5—5 of Fig. 4 and

Fig. 6 is plan view of a fraction of the hopper of the second conveyor.

Referring to the illustrative drawings, the wheels 1 are suitably supported on the frame 2, the tongue 3' being attachable to the tractor or other means by which the machine is drawn over the ground. A frame 3 is pivotally mounted at its rear end in the brackets 4 mounted on the frame 2 and at its forward end is secured a cable 5 which is attached to a roller 6 mounted on the frame 2 and adapted to be rotated by rotating the hand wheel 7 mounted on the shaft 8 carrying a worm or other means adapted to cause the drum to rotate when the wheel is rotated. The frame 3 may be raised whenever it is desired to regulate the clearance between the forward end of the same and the ground.

The bottom of the frame 3 is formed of a selected number of laterally spaced rods 9. The forward ends of the rods engage the beets or product being loaded as the machine is moved forwardly and direct them into the conveyor frame 3 and between the guards 10 which are secured to opposite sides of the frame 3. Two transverse shafts 11, 12 are mounted on the frame 3 and in the brackets 4, and two sprocket wheels 13, 14 are secured to each shaft, the chain 15 being engaged on the sprockets 13 and chain 16 on the sprockets 14. Cross bars or rods 17 are attached to the chains 15, 16 at selected intervals and a series of spring members 18 is mounted on each bar, so that in the upward or rearward movement of the chains the lower portion of each spring member will project into or through the space between two adjacent rods 9. One end of each member of a series is coiled about the cross rod 17 and the extremity 18 of said end is projected through an opening 19 in a bar 20 that is secured to the rod 17 by the bolts 20'. The conveyor formed by the chains and the spring members travels in the direction of the arrow, Fig. 1, and the spring members as they swing downwardly at the lower or forward end of the conveyor contact the beets that are picked up by the extended portions of the rods and move them up the slope of the slotted bottom of the conveyor frame to the upper end thereof. Any dirt picked up by the fork that is formed by the rods 9, and entering the spaces between the rods 9 is pushed along or downwardly through said spaces and thereby removed. The beets drop from the pick-up conveyor into the hopper 21 of a second conveyor 22 having a slotted bottom 23, by which they are elevated for delivery into a vehicle that is travelling with the machine. The delivery into the vehicle may be accomplished by a third conveyor 24 having a hopper 25 at its inner end into which the beets fall from the upper end of the conveyor 22. The third conveyor is pivotally mounted so as to regulate the height of its discharge end. A series of fingers 27 is mounted in the hopper 21 to prevent the beets from dropping into the lower end of the conveyor 22. The fingers 29 supported by the conveyor chain mechanism 30 pass between the fingers 27 and engage the beets and move them up the slope of the conveyor 22.

A suitable source of power 31 drives the conveyors through the belt 32 and the shaft 33, which carries the sprockets 34, 35, 36, 37. The chain 38 engages the sprocket 34 and a sprocket 39 on the shaft 12 of the pick-up conveyor. The chains 40 of the second conveyor are driven by the sprockets 36, 37, said chains also engaging sprockets 41 at the lower end of the second conveyor and sprockets 42 on the shaft 43 at the upper end of said conveyor. The shaft 43 is driven by the shaft 33 through the sprocket 35, chain 44 and the sprocket 45 on the shaft 43. The shaft 43 drives the third conveyor chains through the sprocket-chain connection 46, the gearing 47 and the shaft 48, which shaft carries sprockets engaging said chains.

Heretofore, beets as they are topped are usually deposited in numerous piles on the field and loaded by hand from the piles into the vehicle. My machine picks up practically all the beets in its path whether they are in piles or scattered. Dirt picked up by the fork escapes through the slotted bottom of the first conveyor as the beets are advanced by the spring members 18 and such dirt as passes into the second conveyor may escape through the slotted bottom of that conveyor.

The spring members 18 flex more or less as they engage the beets and because of such fact they do not damage the beets. The anchorage of the extremity of the coiled portion of each member 18 prevents relative movement of the member 18 and the cross rod 17 supporting it. Should a member 18 break, it is a simple matter to substitute a new one. The rod 17 is disconnected from the chains, the locking bar 20 is removed and the broken member together with those between it and the end of the rod are slipped off the rod. The new member and the others that have been removed are placed on the rod, the locking bar is restored in place and the unit again attached to the chains. The spring members 18 when they contact the beets, tend to remove the soil that is clinging to them even if the soil is wet, and since said members travel in the spaces between the rods 9 and clear said spaces of dirt no clogging of the pick-up mechanism occurs and the capture and advancement of the beets is most effectively accomplished.

The rods 9 are anchored at the upper ends to an angle iron 45 that is mounted on the frame 3 and a second angle iron 46 at a proper point in the forward portion of the rods may also be attached to the frame 3 and the rods 9 extended through it. Notches 47 are provided in each bar to permit the spring members 18 to pass.

What I claim is:

1. In a loading machine, a conveyor frame including a pair of side members, a pair of shafts spanning said side members and journalled thereon, a pair of sprocket wheels carried by each shaft and located adjacent the side members, endless chains trained around said wheels, cross shafts connecting said chains at spaced intervals, a set of spring fingers for each cross shaft, each finger consisting of a rod having one end portion wound around the shaft and provided with an upstanding extremity, a bar for each cross shaft extending over the wound portions of the rods and having the extended extremities bearing against its edge and bolts passing through each bar and the corresponding cross shaft to clamp the said wound portions in place.

2. In a loading machine, a conveyor frame including a pair of side members, a pair of shafts spanning said side members and journalled thereon, a pair of sprocket wheels carried by each shaft and located adjacent the side members, endless chains trained around said wheels, cross shafts connecting said chains at spaced intervals, a set of spring fingers for each cross shaft, each finger consisting of a rod having one end portion wound around the shaft and provided with an upstanding extremity, a bar for each cross shaft extending over the wound portions of the rods and having the extended extremities bearing against its edge, bolts passing through each bar and the corresponding cross shaft to clamp the said wound portions in place, a rack frame depending from the conveyor frame and including longitudinal and transverse members, each of said transverse members comprising an angle bar having an upstanding leg provided with a series of notches wherethrough the ends of the fingers pass in operation, said leg being provided with a series of rod receiving openings alternating with said notches, and gathering bars passing through said openings and projecting forwardly of the foremost upstanding leg.

CHESTER M. GUSTIN.